(12) United States Patent
Ono et al.

(10) Patent No.: US 12,435,413 B2
(45) Date of Patent: Oct. 7, 2025

(54) INDIUM COMPOUND AND METHOD FOR FORMING INDIUM-CONTAINING FILM USING SAID INDIUM COMPOUNDS

(71) Applicant: L'Air Liquide, Société Anonyme pour l'Etude et l'Exploitation des Procédés Georges Claude, Paris (FR)

(72) Inventors: Takashi Ono, Yokosuka (JP); Christian Dussarrat, Tokyo (JP)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 142 days.

(21) Appl. No.: 17/436,567

(22) PCT Filed: Mar. 2, 2020

(86) PCT No.: PCT/JP2020/008745
§ 371 (c)(1),
(2) Date: Mar. 29, 2022

(87) PCT Pub. No.: WO2020/179748
PCT Pub. Date: Sep. 10, 2020

(65) Prior Publication Data
US 2022/0243319 A1 Aug. 4, 2022

(30) Foreign Application Priority Data
Mar. 5, 2019 (JP) .................................. 2019-039086

(51) Int. Cl.
*C23C 16/40* (2006.01)
*C07F 5/00* (2006.01)
*C07F 17/00* (2006.01)
*C23C 16/455* (2006.01)

(52) U.S. Cl.
CPC .............. *C23C 16/407* (2013.01); *C07F 5/00* (2013.01); *C07F 17/00* (2013.01); *C23C 16/45536* (2013.01); *C23C 16/45553* (2013.01)

(58) Field of Classification Search
None
See application file for complete search history.

(56) References Cited

U.S. PATENT DOCUMENTS

| | | | | |
|---|---|---|---|---|
| 3,152,157 A | * | 10/1964 | Shapiro | C07F 1/02 44/361 |
| 4,965,222 A | * | 10/1990 | Staring | C30B 25/02 148/DIG. 119 |
| 2003/0181745 A1 | | 9/2003 | Shenai-Khatkhate et al. | |
| 2008/0032062 A1 | | 2/2008 | Meiere | |
| 2008/0102205 A1 | * | 5/2008 | Barry | C23C 16/18 427/250 |
| 2008/0286448 A1 | * | 11/2008 | Elam | C23C 16/45527 427/255.35 |
| 2011/0206846 A1 | | 8/2011 | Elam et al. | |
| 2014/0210835 A1 | * | 7/2014 | Hong | G09G 3/20 345/530 |
| 2019/0349025 A1 | | 11/2019 | Murakami | |
| 2020/0181775 A1 | * | 6/2020 | Mizutani | H01B 1/08 |

FOREIGN PATENT DOCUMENTS

| | | | |
|---|---|---|---|
| JP | 11012283 A | * 1/1999 | |
| JP | 2016 511936 | 4/2016 | |
| JP | 2018 090855 | 6/2018 | |
| JP | 2019 197994 | 11/2019 | |
| WO | WO 2018 225668 | 12/2018 | |
| WO | WO 2018 234567 | 12/2018 | |
| WO | WO-2018225668 A1 | * 12/2018 | ............. C01G 15/00 |

OTHER PUBLICATIONS

Eesemi. "Dielectric Constant, k" (2005), retrieved from https://eesemi.com (Year: 2005).*
Si et al. "Why In2O3 Can Make 0.7 nm Atomic Layer Thin Transistors". (2020) Nanoletters. https://dx.doi.org/10.1021/acs.nanolett.0c03967 (Year: 2020).*
Beachley, et al., "Reagents Based on Cyclopentadienyl Derivatives of the Group 14 Elements for the Synthesis of Indium(I) Derivatives Crystal and Molecular Structure of In(C5H4SiMe3)," Organometallics, vol. 9, No. 9, 1990, pp. 2488-2492.
Beachley Jr., O.T. et al., (Tert-butyl)cyclopentadienylindium(I), In($C_5H_4CMe_3$): synthesis, characterization and X-ray structural study, Journal of Organometallic Chemistry, vol. 418, No. 2, Oct. 22, 1991, 165-171.
Mizutani F. et al., AF1-TuM-6 high purity indium oxide films prepared by modified ALD using liquid ethylcyclopentadienyl Indium, ALD2017 preprints, Jul. 18, 2017.
Mizutani F. et al., AF2-TuM15 reaction mechanisms of the atomic layer deposition of indium oxide thin films using ethylcyclopentadienyl Indium, ALD2018 preprints, Jul. 30, 2018, p. 88.
Tacke, M. et al., Direct synthesis of organometallics V. Direct synthesis of isopropylcyclopentadienyl M(I) compounds of Ga, TI, Mn and Cu via metal vapour cocondensation, and their spectroscopic characterization, Journal of Molecular Structure, vols. 408-409, Jun. 1, 1997, 507-512.
International Search Report and Written Opinion for corresponding PCT/JP2020/008745, May 26, 2020.

(Continued)

*Primary Examiner* — Jose I Hernandez-Kenney
(74) *Attorney, Agent, or Firm* — Yan Jiang (57) ABSTRACT

A process for forming an indium-containing film on at least part of the surface of a substrate, the process comprising (a) placing a substrate into a chamber; (b) introducing a vapor that includes an indium-containing compound into the chamber; (c) purging the chamber with a first purge gas; (d) introducing an oxygen-containing gas into the chamber; and (e) purging the chamber with a second purge gas; and (f) repeating steps (b)-(e) at a temperature of ≥225° C. and ≤400° C. until a desired thickness of the indium-containing film is obtained.

10 Claims, 2 Drawing Sheets

(56) References Cited

OTHER PUBLICATIONS

Libera, J.A. et al., Indium oxide atomic layer deposition facilitated by the synergy between oxygen and water, Chem. Mater. 2011, 23, 2150-2158.

Barry, S.T. et al., Chemical vapor deposition of $In_2O_3$ thin films from a tris-guanidinate indium precursor, Dalton Trans., 2011, 40, 9425-9430.

Elam, J.W. et al., Atomic layer deposition of In2O3 using cyclopentadienyl indium: a new synthetic route to transparent conducting oxide films, Chem. Mater. 2006, 18, 3571-3578.

Maeng, W.J. et al., Atomic layer deposition of highly conductive indium oxide using a liquid precursor and water oxidant, Ceramics Int'l 41 (2015) 10782-10787'.

Nilsen, O. et al., Thin films of $In_2O_3$ by atomic layer deposition using $In(acac)_3$, Thin Solid Films 517 (2009) 6320-6322.

Ott, A.W. et al., Surface chemistry of In2O3 deposition using $In(CH_3)_3$ and $H_2O$ in a binary reaction sequence, Applied Surface Science 112 (1997) 205-215.

Park, J.-H et al., The x-ray single crystal structure of $[Me_2In(acac)]_2$ and its use as a single-source precursor for the deposition of indium oxide thin films, J. Mater. Chem., 2001, 11, 2346-2349.

Ritala, M. et al., ALE growth of transparent conductors, Mat. Res. Soc. Symp. Proc. vol. 426, 1996 Materials Research Society, 513-518.

Ritala, M. et al., Enhanced growth rate in atomic layer epitaxy of indium oxide and indium-tin oxide thin films, Electrochemical and Solid-State Letters, 1 (3) 156-157 (1998).

Sheel, D.W. et al., Deposition of fluorine doped indium oxide by atmospheric pressure chemical vapour deposition, Thi9n Solid Films 520 (2011) 1242-1245.

Yeom, H.-I. et al., High mobility polycrystalline indium oxide thin-film transistors by means of plasma-enhanced atomic layer deposition, J. Mater. Chem. C. 2016, 4, 6873-6880.

\* cited by examiner

INDIUM COMPOUND AND METHOD FOR FORMING INDIUM-CONTAINING FILM USING SAID INDIUM COMPOUNDS

CROSS REFERENCE TO RELATED APPLICATIONS

This application is a 371 of International Application No. PCT/JP2020/008745, filed Mar. 2, 2020, which claims priority to Japanese Patent Application No. 2019-039086, filed Mar. 5, 2019, the entire contents of which are incorporated herein by reference.

TECHNICAL FIELD

The present invention relates to indium compounds and a process for forming indium-containing film using said indium compounds.

BACKGROUND

Indium-containing oxides are widely employed in industry, because they are transparent and conduct electricity. For example, ITO (indium tin oxide) is widely used for liquid crystal displays (LCD) and electrodes. And indium oxide films with other metallic elements added are also in general use. Indium oxide films with other metallic elements added have higher electrical conductivity than indium oxide films which include indium as the only metallic element. Recently, materials such as In—Ga—Zn—O, termed IGZO, with indium, gallium and zinc included in a transparent thin-film transistor, are being fitted in specified types of thin-film transistors (TFT). In addition to Ga and Zn, There are also materials using other metals such as Sn, rare earths, Al and Mg in films which include indium.

The ITO and IGZO films above are currently being formed by sputtering carried out under a high vacuum of about 1 Pa or less. However, it is difficult to form films of a uniform thickness on uneven surfaces by sputtering. In addition, when attempting formation of ITO or IGZO films on the flexible organic substrates which have appeared in recent years, there is also a possibility of incompatibility with the low pressure required by the sputtering process. Accordingly, research is underway into indium materials for forming indium-containing films by chemical vapor deposition (CVD) or atomic layer deposition (ALD).

Many such indium materials are known which are in a solid state at the temperature at which they will be supplied. However, from the point of view of ease of supply and ease of supplying vapor at a uniform concentration, liquid materials rather than solid materials are ideal as materials employed in film-making processes. Accordingly, Patent Document 1 and Non-patent Documents 1 and 2, for example, disclose processes for forming indium-containing films by CVD or ALD by employing as indium material cyclopentadienylindium compounds, which are liquid at ambient temperature.

PRIOR ART DOCUMENTS

Patent Document

Patent Document 1: JP 2018-90855 A

Non-Patent Documents

Non-patent Document 1: Fumikazu Mizutani et al., "AF1-TuM6 High Purity Indium Oxide Films Prepared by Modified ALD using Liquid Ethylcyclopentadienyl Indium", ALD2017 preprints, Jul. 18, 2017

Non-patent Document 2: Fumikazu Mizutani et al., "AF2-TuM15 Reaction Mechanisms of the Atomic Layer Deposition of Indium Oxide Thin Films Using Ethylcyclopentadienyl Indium", ALD2018 preprints, Jul. 30, 2018, p. 88

Patent document 1 discloses a method for stabilizing cyclopentadienylindium compounds by carrying out pretreatment using contact with oxygen, because, in the liquid state at ambient temperature, said cyclopentadienylindium compounds are unstable due to sensitivity to heat, light and air. However, this method has the problem that the process for preparing the indium compounds is complex.

On the other hand, in addition to the physical properties of the material, when forming indium-containing films by CVD or ALD it is necessary to raise throughput by expressing high GPC (growth per cycle). Especially when forming films by ALD, a process with a wide ALD window, which enables formation of a uniform high quality film with a low content of impurities by making film formation possible at high temperatures, is required.

Although Non-patent Document 1 (ALD2017) describes a process for forming an $In_2O_3$ film, using ethylcyclopentadienylindium, In(EtCp), water and oxygen plasma as coreactants, GPC is only 0.3-0.4 Å/cycle.

Non-patent Document 2 (ALD2018) describes a process for forming an $In_2O_3$ film, using In(EtCp), water and oxygen plasma as an oxidizing agent, and a process for forming an $In_2O_3$ film using water and oxygen as coreactants, and GPC is 0.9 Å/cycle and 1.1 Å/cycle, respectively, but throughput can be said to be low, since a plurality of reactants have to be employed.

Given the situation above, development of a process for forming an indium-containing film by ALD at high temperature, which enables an indium compound to be employed without carrying out special pretreatment, and which can give indium-containing film with high throughput, is required.

NOTATIONS AND NOMENCLATURE

We will employ the following notation and nomenclature, and different abbreviations, symbols, and terms throughout the description and claims below.

As used in this specification, the term "hydrocarbon group" indicates a saturated or unsaturated functional group which contains only carbon atoms and hydrogen atoms. The term "hydrocarbon group" further indicates a straight chain, branched or cyclic hydrocarbon group Examples of straight-chain hydrocarbon groups include, but are not restricted to a methyl group, ethyl group, normal (n)-propyl group and normal (n)-butyl group. Examples of branched hydrocarbon groups include, but are not restricted to an isopropyl group, isobutyl group, tertiary (tert)-butyl group and secondary (sec)-butyl group. Examples of cyclic hydrocarbon groups include, but are not restricted to a cyclopropyl group, cyclopentyl group and cyclohexyl group.

As used in this specification, the abbreviation "Me" indicates a methyl group, the abbreviation "Et" indicates an ethyl group, the abbreviation "Pr indicates any propyl group (i.e. normal propyl or isopropyl), the abbreviation ""Pr" indicates a normal (n)-propyl group, the abbreviation "'Pr" indicates an isopropyl group, the abbreviation "Bu" indicates any butyl group (i.e. normal (n)-butyl, isobutyl, tertiary (tert)-butyl and secondary (sec)-butyl), the abbreviation ""Bu" indicates a normal (n)-butyl group, the abbreviation "'Bu" indicates a tertiary (tert)-butyl group, the abbreviation "*s*Bu" indicates a secondary (sec)-butyl group, the abbreviation "*i*Bu" indicates an isobutyl group, the abbreviation "Pen" indicates any pentyl group (i.e. normal (n)-pentyl neopentyl, isopentyl, secondary (sec)-pentyl and tertiary (tert)-pentyl) the abbreviation "*t*Pen" indicates a tertiary (tert)-pentyl group, the abbreviation "*s*Pen" indicates a secondary (sec)-pentyl group, the abbreviation "*i*Pen" indicates an isopenyl group, the abbreviation "Cp" indicates a cyclopentadienyl group, and the abbreviation "In" indicates indium.

SUMMARY

The present invention has been devised in order to solve, at least partially, the problems mentioned above, and can be expressed as the embodiments and application examples presented below.

Application Example 1

One embodiment of a process for forming indium-containing film according to the present invention is a process for forming an indium-containing film on at least part of the surface of a substrate, characterized in that it includes
(a) a step of placing an aforementioned substrate inside a chamber, and
(b) a step of introducing a gas which includes an indium compound represented by general formula (1) below into the aforementioned chamber, and
(c) a first purging step after carrying out the aforementioned step (b), in which the aforementioned chamber is purged with a first purge gas, and
(d) a step in which an oxygen-containing gas is introduced into the aforementioned chamber, and
(e) a second purging step after carrying out the aforementioned step (d), in which the aforementioned chamber is purged with a second purge gas,
and steps (b)-(e) are repeated, at a temperature of ≥225° C. and ≤400° C., until the desired thickness of the aforementioned indium-containing film is obtained.

$$In(C_5R^1_xH_{(5-x)}) \qquad (1)$$

(Where, in general formula (1), x is an integer 1-5, and each $R^1$ is independently a C1-8 hydrocarbon group.)

The present inventors have discovered that among indium compounds having a cyclopentadienyl group, compounds having a hydrocarbon group as a substituent group on the cyclopentadienyl group are particularly ideal for forming indium-containing films.

By employing an indium compound having a cyclopentadienyl group according to the present invention when forming an indium-containing film, a film low in carbon impurities can be obtained. In addition, due to the fact that they have a hydrocarbon group as a substituent group on the cyclopentadienyl group, indium compounds having a cyclopentadienyl skeleton according to the present invention have a low melting point, and have improved stability in air and thermal- and photostability. Consequently, indium compounds having a cyclopentadienyl skeleton according to the present invention are liquids at the desired indium compound supply temperature, and are easily supplied to the film-forming process.

In the present invention, formation of indium-containing films can be carried out by ALD, and in order to ensure a broad ALD window, and obtain high quality, it is necessary to be able to form a film at high temperatures. Indium compounds according to the present invention have high heat stability, and therefore the film-forming process can be carried out at high temperature. Moreover, when indium compounds according to the present invention are employed, a high GPC is obtained. Consequently, they are ideal materials, having a broad ALD window, for obtaining high quality films with a high throughput.

Application Example 2

In the process for forming indium-containing film set forth in the application example above, the aforementioned indium-containing film can be an indium oxide-containing film, and the aforementioned oxygen-containing gas can at least include ozone.

Although water and oxygen, etc., can be considered as an oxidizing agent when forming an oxide film, a plasma source is often used in order to get a higher film-forming speed. However, the film that is formed may be damaged when a plasma source is employed. Accordingly, use of ozone is ideal, because it raises film forming speed and causes little damage to the film.

Application Example 3

In the process for forming indium-containing film set forth in the application examples above, the aforementioned indium-containing film can be an insulating material with a relative permittivity (k value) of ≥7.

Application Example 4

Moreover, in the application examples above the oxygen-containing gas can further include water, hydrogen peroxide, oxygen, nitric oxide, nitrous oxide, nitrogen dioxide, a sulfur oxide or a gas comprising a combination thereof.

Application Example 5

In the application examples above, the substrate can be glass, silicon, silica or a polymer.

Application Example 6

In the application examples above the film-forming speed in one cycle of steps (b)-(e) can be ≥0.7 Å/cycle.

When an indium compound according to the present invention with high heat stability is employed, a broad ALD window is guaranteed, and it is possible to carry out a process which forms a high-quality film. And use of such an indium compound enables film-forming with a high GPC.

The application examples above are preferably ALD film-forming processes. Therefore, there is no need for a high vacuum as the pressure in the chamber during film formation, as in sputtering processes, for example. Consequently, even when the substrate is incompatible with a high vacuum process, an indium-containing film can be formed by a process in these application examples, In addition, by making the film-forming temperature a high temperature ≥225° C. and ≤400° C., it can give a high quality indium-containing film containing little impurities.

Application Example 7

One embodiment of an indium compound according to the present invention is an indium compound for forming an indium-containing film, represented by general formula (2) below.

$$In(C_5R^1_xH_{(5-x)}) \qquad (2)$$

(Here, in general formula (2), x is an integer 1-5, and each $R^1$ is independently a C3-8 hydrocarbon group.)

Application Example 8

The indium compound set forth in the application example above can be $In(C_5^iPrH_4)$, $In(C_5^sBuH_4)$, $In(C_5^iBuH_4)$, $In(C_5^sPenH_4)$, or $In(C_5^iPenH_4)$.

In the indium compound set forth in the application example above, the hydrocarbon group which is the substituent group on the cyclopentadienyl group has a branched structure, reactivity is low, and photostability and stability in air are particularly high. Consequently, they are easy to handle, and can be maintained for long periods in a highly pure state, without carrying out any special pretreatment. These compounds also have high heat stability, and are, therefore, ideally suited to high-temperature film-forming processes.

Application Example 9

One embodiment of an indium compound according to the present invention is an indium compound for forming an indium-containing film represented by general formula (3) below.

$$In(C_5A_xR^2_yH_{(5-x-y)}) \qquad (3)$$

(Here, in general formula (3), x is an integer 1-5, y is an integer 0-4, each A is, independently, $SiR^3R^4R^5$ or $GeR^3R^4R^5$; $R^3$, $R^4$ and $R^5$ are each, independently, a C1-6 hydrocarbon group or hydrogen, and $R^2$ is a C1-6 hydrocarbon.)

Application Example 10

One embodiment of an indium compound according to the present invention is an indium compound for forming an indium-containing film, represented by general formula (4) to general formula (6) below.

Formula 1

(4)

Formula 2

(5)

Formula 3

-continued (6)

(Here, in general formula (4) to general formula (6), each $R^6$ is, independently, a C1-6 hydrocarbon group or hydrogen.)

Application Example 11

One embodiment of an indium compound according to the present invention is an indium compound for forming an indium-containing film, represented by general formula (7) below.

$$In(NC_4R^7_xH_{(4-x)}) \qquad (7)$$

(Here, in general formula (7), x is an integer 1-4, and each $R^7$ is independently a C2-6 straight-chain, branched (except for $^tBu$) or cyclic hydrocarbon group or hydrogen.)

Application Example 12

One embodiment of an indium compound according to the present invention is an indium compound for forming an indium-containing film, represented by general formula (8) below.

$$In(N_xC_{5-x}R^8_yH_{(5-x-y)}) \qquad (8)$$

(Here, in general formula 8), x is an integer 2-4, y is an integer 0-(5-x), and each $R^8$ is independently a C1-6 straight-chain, branched or cyclic hydrocarbon group.)

The indium compounds having a non-cyclic pentadienyl, cyclohexadienyl or cycloheptadienyl skeletal structure, or a pyrrolyl, pyrazolyl or imidazolyl nitrogen-containing heterocyclic structure set forth in the application examples above have high stability similar to cyclopentadienylindium compounds, due to the fact that, like a cyclopentadienyl group, 6 electrons are donated to indium.

Application Example 13

The indium compounds set forth in the application examples above preferably have a melting point of ≤80° C.

In order to make a high-temperature film-forming process feasible, the indium compound more preferably has high heat stability, and is in the liquid state at high temperatures. By carrying out the process of forming an indium-containing film at a temperature of at least 200° C., faster film-formation becomes possible, and therefore, high heat-stability at film-forming temperatures upwards of 80° C. is required. In addition, indium compounds are normally delivered from a container heated to ≥20° C., and are, therefore, preferably liquid at this container temperature.

Because indium compounds according to the present invention are highly stable, and have a melting point lower than 80° C., the temperature at which they are used, they can be used in the liquid state. And since they also have adequate vapor pressure and reactivity, they are ideal as materials for forming indium-containing films.

Application Example 14

The indium compound set forth in the application example above can also be materials for forming indium-containing films for manufacturing semiconductor devices.

Application Example 15

The indium compound set forth in the application examples above can be materials for forming indium-containing films by a film-forming process selected from a set comprising chemical vapor deposition (CVD), atomic layer deposition (ALD), plasma-enhanced chemical vapor deposition (PECVD), plasma-enhanced atomic layer deposition (PEALD), pulsed chemical vapor deposition (PCVD), low pressure chemical vapor deposition (LPCVD), subatmospheric chemical vapor deposition (SACVD), atmospheric pressure chemical vapor deposition (APCVD), spatial ALD, radical-assisted deposition, supercritical fluid deposition, spin-on deposition and combinations thereof.

With the present invention, because the indium compounds are highly stable to light and heat, the indium compounds can be employed in high-temperature film-forming processes without carrying out special pretreatment. Consequently, they enable formation of high quality indium-containing films.

Application Example 16

One embodiment of a process for forming indium-containing film according to the present invention is a process for forming an indium-containing film on at least part of the surface of a substrate characterized in that it includes
(a) a step of placing an aforementioned substrate inside a chamber, and
(b) a step of introducing a gas which includes an indium compound of any one of Application Example 7 to Application Example 12 into the aforementioned chamber, and
(c) a first purging step after carrying out the aforementioned step (b), in which the aforementioned chamber is purged with a first purge gas, and
(d) a step in which an oxygen-containing gas is introduced into the aforementioned chamber, and
(e) a second purging step after carrying out the aforementioned step (d), in which the aforementioned chamber is purged with a second purge gas,
and steps (b)-(e) are repeated, at a temperature of ≥225° C. and ≤400° C., until the desired thickness of the aforementioned indium-containing film is obtained.

The indium compounds in Application Example 7 to Application Example 13 above, like compounds represented by general formula (1) above, have a comparatively low melting point, and are outstandingly stable in air and to heat and light. Consequently, the indium compounds in Application Example 7 to Application Example 13 above are liquids at the desired indium compound supply temperature, and are easily supplied to the film-forming process.

Formation of indium-containing films can be carried out by ALD with the present invention, and in order to ensure a broad ALD window and obtain high quality it is necessary to be able to form a film at high temperatures. The indium compounds in Application Example 7 to Application Example 13 above have high heat stability, and therefore the film-forming process can be carried out at high temperature. Moreover, a high GPC is obtained by employing the indium compounds in Application Example 7 to Application Example 13 above. Consequently, they are ideal materials having a broad ALD window, for obtaining high quality films with a high throughput.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

DETAILED DESCRIPTION OF PREFERRED EMBODIMENTS

Modes for carrying out the present invention are described in detail below. It should be understood that the present invention is not restricted only to the embodiments described below, and includes various other different examples within a scope which does not alter the essential substance of the present invention.

Indium Compounds

The indium compound according to one embodiment of the present invention is a compound represented by general formula (1) to (8) below.

Compounds Represented by General Formula (1)

$$\text{In}(C_5R^1_xH_{(5-x)}) \qquad (1)$$

(Here, in general formula (1), x is an integer 1-5, and each $R^1$ is independently a C1-8 hydrocarbon group.)

Compounds represented by general formula (1) above have a structure with hydrocarbon group on the cyclopentadienyl group. The melting point of said compound is lowered and stability in air and to heat and light are raised by having such a structure. Consequently, compounds represented by general formula (1) above are liquids at the desired indium compound supply temperature, and are easily supplied to the film-forming process.

Although x in general formula (1) above is an integer 1-5, an integer 1-4 is preferred, an integer 1-3 is more preferred, an integer 1-2 is even more preferred, and 1 is especially preferred. Provided that x is in the range above, When an indium-containing film is formed by employing a compound represented by general formula (1) above, it is easy to obtain a film low in carbon impurities.

Although $R^1$ in general formula (1) above is a C1-8 hydrocarbon group, a C2-6 hydrocarbon group is preferred, a C3-6 hydrocarbon group is more preferred, and C3-6 hydrocarbon group including a secondary carbon is more preferred. The melting point of compounds represented by general formula (1) above is lowered and stability in air and to heat and light is raised when $R^1$ is a hydrocarbon group described above. Because such compounds represented by general formula (1) above have high stability, they can be formed into films at high temperatures, and by making the film-forming temperature a high temperature ≥225° C. and ≤400° C., for example, they can give a high quality indium-containing film containing little impurities.

Examples of such hydrocarbon groups include a methyl group, ethyl group, n-propyl group, an isopropyl group, n-butyl group, isobutyl group, sec-butyl group, tert-butyl group, n-pentyl group, neopentyl group, isopentyl group, sec-pentyl group, 3-pentyl group, tert-pentyl group, n-hexyl group, sec-hexyl group, n-heptyl group, sec-heptyl group, n-octyl group and sec-octyl group. Of these, an isopropyl group, isobutyl group, sec-butyl group, isopentyl group, sec-pentyl group, 3-pentyl group, sec-hexyl group, sec-heptyl group and sec-octyl group, etc., which include a secondary hydrocarbon, are preferred; and the secondary hydrocarbon groups sec-butyl group and sec-pentyl group are more preferred.

Therefore, among compounds represented by general formula (1) above, a compound represented by general formula (2) below is preferred, from the viewpoint of stability in air and to heat and light and the ability to form an indium-containing film at high temperatures, (2)

(Here, in general formula (2), x is an integer 1-5, and each $R^1$ is independently a C3-8 hydrocarbon group which includes a secondary carbon.)

Compounds Represented by General Formula (3)

(3)

Here, x in general formula (3) is an integer 1-5, y is an integer 0-4, each A is, independently, $SiR^3R^4R^5$ or $GeR^3R^4R^5$; $R^3$, $R^4$ and $R^5$ are each, independently, a C1-6 hydrocarbon group or hydrogen, and $R^2$ is a C1-6 hydrocarbon.)

In general formula (3) above, the total number of carbons in the substituent groups $R^3+R^4+R^5$ is 1-18, but a total number of carbons of 1-10 is preferred and 1-7 is more preferred.

Examples of $SiR^3R^4R^5$ or $GeR^3R^4R^5$ include a methylsilyl group, ethylsilyl group, ethylmethylsilyl group, diethylmethylsilyl group, dimethylethylsilyl group, trimethylsilyl group, triethylsilyl group, tri(isopropyl)silyl group, tri(n-propyl)silyl group, tri(n-butyl)silyl group, tri(isobutyl)silyl group and tri(sec-butyl)silyl group. Of these, a trimethylsilyl group and triethylsilyl group are preferred.

In general formula (3) above, $R^2$ is a C1-6 hydrocarbon group, but 1-4 is preferred, and it is more preferably 1-3. Examples of such hydrocarbon groups include a methyl group, ethyl group, n-propyl group, isopropyl group, n-butyl group, isobutyl group, sec-butyl group, tert-butyl group, n-pentyl group, neopentyl group, isopentyl group, sec-pentyl group, 3-pentyl group, tert-pentyl group, n-hexyl group, and sec-hexyl group. Of these, a methyl group, ethyl group, n-propyl group and isopropyl group, etc., are preferred.

Examples of indium compounds represented by general formula (3) below include ((trimethylsilyl)cyclopentadienyl)indium, ((methyl)(trimethylsilyl)-cyclopentadienyl)indium, ((ethyl)(trimethylsilyl)cyclopentadienyl)indium, ((isopropyl)(trimethylsilyl)cyclopentadienyl)indium, ((diethylmethylsilyl)-cyclopentadienyl)indium, ((diethylmethylsilyl)cyclopentadienyl)indium, ((triethylsilyl)-cyclopentadienyl)indium, ((triethylsilyl)(ethyl)cyclopentadienyl)indium, ((trimethylgermanium)cyclopentadienyl)indium, ((methyl)(trimethylgermanium)-cyclopentadienyl)indium, ((ethyl)(trimethylgermanium)cyclopentadienyl)indium, ((isopropyl)(trimethylgermanium)cyclopentadienyl)indium, ((dimethylethyl-germanium)cyclopentadienyl)indium, ((diethylmethylgermanium)cyclopentadienyl)-indium, ((triethylgermanium)cyclopentadienyl)indium, and ((triethylgermanium)(ethyl)cyclopentadienyl)indium.

Indium compounds represented by general formula (3) above have a structure with a hydrocarbon group having a silicon group or germanium group as a substituent group on the cyclopentadienyl group, By placing a substituent group containing Si or Ge in this way, it becomes possible to obtain highly stable indium compounds Compounds Represented by General Formula (4) to (6)

[Formula 4]

(4)

[Formula 5]

(5)

[Formula 6]

(6)

(Here, in general formula (4) to general formula (6), each $R^6$ is independently a C1-6 hydrocarbon group or hydrogen.)

Although $R^6$ in general formula (4) to general formula (6) is a C1-6 hydrocarbon group, it is preferably a C1-4 hydrocarbon group, and it is more preferably a C1-3 hydrocarbon group.

Examples of such hydrocarbon groups include a methyl group, ethyl group, n-propyl group, isopropyl group, n-butyl group, isobutyl group, sec-butyl group, tert-butyl group, n-pentyl group, neopentyl group, isopentyl group, sec-pentyl group, 3-pentyl group, tert-pentyl group, n-hexyl group, and sec-hexyl group. Of these, a methyl group, ethyl group, n-propyl group and isopropyl group are preferred

Compounds Represented by General Formula (7)

(7)

(Here, in general formula (7), x is an integer 1-4, and each $R^7$ is independently a C2-6 straight-chain, branched (except for $^t$Bu) or cyclic hydrocarbon group or hydrogen.)

In general formula (7), $R^7$ is preferably $^s$Bu, $^s$Pen or $^t$Pen.

Compounds Represented by General Formula (8)

(8)

(Here, in general formula 8), x is an integer 2-4, y is an integer 0-(5-x), and each $R^8$ is independently a C1-6 straight-chain, branched or cyclic hydrocarbon group.)

Although $R^6$ in general formula (4) to general formula (6) is a C1-6 hydrocarbon group, it is preferably a C3-6 hydrocarbon group, and it is more preferably a C4-5 hydrocarbon group.

Compounds represented by general formula (7) to general formula (8) above have a structure with hydrogen or a hydrocarbon group on a nitrogen-containing heterocyclic ring. By having such a structure, as in the case of compounds having a cyclopentadienyl group, melting point is lowered and stability in air and to heat and light are raised. Consequently, compounds represented by general formula (7) to general formula (8) above are liquids at the desired indium compound supply temperature, and are easily supplied to the film-forming process.

Process for Forming an Indium-Containing Film

An indium-containing film on a substrate can be obtained by forming a film employing at least one compound selected from indium compounds represented by general formula (1) to (8) above.

There are no particular restrictions as regards the substrate, provided that it is a substance that allows the growth of an indium-containing film, and it can be glass, silicon, silica or a polymer, for example, depending on the purpose of the indium-containing film.

Methods for introducing the indium compound into the chamber in which the substrate is placed, in order to form an indium-containing film, include, for example, decreasing the pressure inside the chamber to draw in the desired quantity of vapor of the indium compound filling the indium compound container, bubbling methods, and direct injection methods, but it can be any method which supplies the desired quantity of indium compound to the substrate, and is not restricted to these methods.

Because indium compounds represented by general formula (1) to (8) above have high heat stability, the temperature during storage and supply can be a comparatively high temperature in the region of $\geq 50°$ C. and $\leq 200°$ C.

In addition, a carrier gas can be employed in order to entrain the vapor of the indium compound. There is no restriction as the carrier gas employed, provided that it is inert towards the indium compound, and it can be nitrogen or argon, for example.

There is no restriction as to the process for forming an indium-containing film, and it can be a film-forming process selected from a set comprising chemical vapor deposition (CVD), atomic layer deposition (ALD), plasma-enhanced chemical vapor deposition (PECVD), plasma-enhanced atomic layer deposition (PEALD), pulsed chemical vapor deposition (PCVD), low pressure chemical vapor deposition (LPCVD), subatmospheric chemical vapor deposition (SACVD), atmospheric pressure chemical vapor deposition (APCVD), spatial ALD, radical-assisted deposition, supercritical fluid deposition, spin-on deposition and combinations thereof.

When an indium compounds represented by general formula (I) is employed, atomic layer deposition (ALD) is particularly ideal as a method for forming an indium-containing film.

After carrying out a step of placing the substrate in the chamber, ALD includes a step of introducing the indium compound into the chamber in the form of a gas, and a step of purging the indium-containing gas from the chamber by means of a purge gas (the first purge gas) after reacting the substrate and the indium compound, and a step in which an oxygen-containing gas is introduced into the aforementioned chamber after purging, and a step of purging the oxygen-containing gas from the chamber by means of a purge gas (the second purge gas). The step of introducing the indium compound gas, and the step of introducing an oxygen-containing gas, can be carried out alternately a given number of times. The two steps can be carried out alternately until reaching the desired thickness of the indium containing film.

There is no particular restriction as to the oxygen-containing gas provided that it is a gas containing oxygen, and it can be water, oxygen or ozone. Use of ozone is ideal, because it gives a higher film-forming speed than water or oxygen, without employing plasma.

The purge gas can be any gas that is inert towards the indium compound, examples include nitrogen and argon, but there is no restriction as to these. The first purge gas and second purge gas can be the same or different.

The film-forming temperature can be 225° C.-400° C., and is preferably 230° C.-300° C. and more preferably 240° C.-260° C.

EXAMPLES

Below, the present invention is described in specific terms by means of examples; however, the present invention is not restricted to these examples.

Example 1: Synthesis of In($^s$BuCp)

300 mL of dehydrated pentane and 27.8 g of s-butylcyclopentadiene (0.22 mol, 1.1 equiv.) were put into a 1 L capacity container. 131 mL of a 1.6M n-butyllithium solution (0.21 mol, 1 equiv.) was added dropwise at room temperature (20° C.), The resulting reaction mixture was stirred for 3 hours with a magnetic stirrer, and then the solvent was distilled off at decreased pressure, to give a white solid.

This white solid was suspended in 500 mL of dehydrated diethyl ether; 31.6 g of InCl (0.21 mol, 1 equiv.) was added, followed by stirring at room temperature, and then a yellow filtrate was recovered by filtration.

The solvent was removed from the resulting liquid by distillation under decreased pressure, to give a yellow liquid. The resulting liquid was introduced to a single distillation device, and the pale yellow liquid fraction recovered by distillation at a temperature of 40° C. to 45° C. and pressure of 5 Pa was obtained with a yield of 45.3 g (0.19 ml.), percentage yield (relative to InCl) 91%, The resulting pale yellow liquid was a liquid at the storage temperature, room temperature 23° C.

The resulting In($^s$BuCp) was analysed by nuclear magnetic resonance (NMR). The results of $^1$H-NMR using $C_6D_6$ confirmed the structure of In($^s$BuCp). $^1$H-NMR ($\delta$, $C_6D_6$, 400 MHz, 25° C.): $\delta$ 5.91 (t, 2H, Cp-H), 5.81 (t, 2H, Cp-H), 2.46 (m, 1H, Cp-CH—), 1.60-1.35 (m, 2H, —$CH_2CH_3$), 1.15 (d, 3H, —CH($CH_3$)$CH_2CH_3$), 0.91 (t, 3H, —$CH_2CH_3$)

A JEOL 400 Mz NMR device was employed for NMR analysis.

Figure 1:
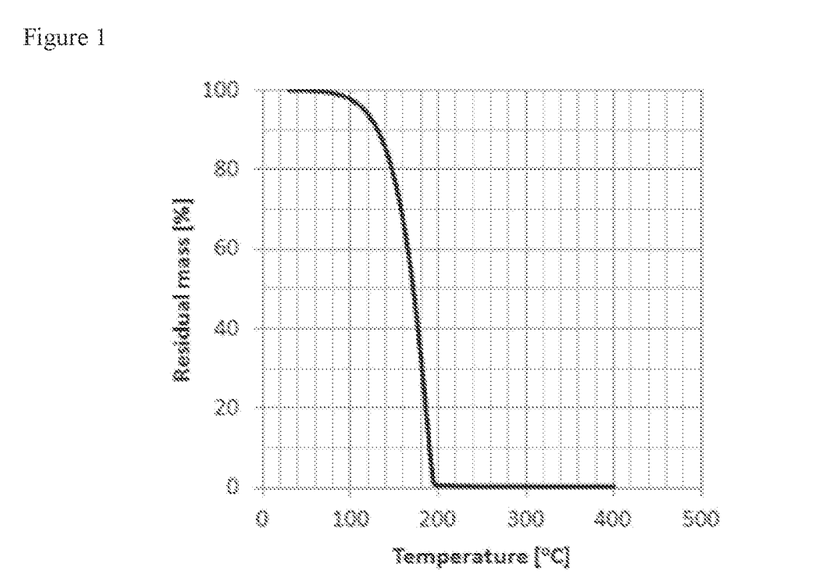
FIG. 1 is a graph showing the result of thermal analysis of In($^s$BuCp) obtained in Example 1.

FIG. 1 is a graph showing the result of thermal analysis of the In($^s$BuCp) obtained above. The conditions of thermal analysis were: TG-DTA measurement with sample weight 25.57 mg, pressure 1 atm., in an atmosphere of nitrogen, heating speed 10.0° C./min. As shown by the solid line in FIG. 1, in thermogravimetric analysis (TGA), 99.4% was vaporized at up to 200° C., with a residue of 0.6%; therefore, it can be said that thermolysis does not occur in a short time at $\leq 200°$ C.

And the result of isothermal gravimetric analysis showed that the vapor pressure of In($^s$BuCp) was 1 Torr at 38.3° C.

Example 2: Synthesis of In($^s$PenCp)

9.5 g of Li($^s$PenCp) (0.067 mol, 1.0 equiv.) and 200 mL of dehydrated diethyl ether were put into a 500 mL capacity flask. Then, 10.1 g of InCl (0.067 mol, 1 equiv.) was added, followed by stirring at room temperature, and then a yellow filtrate was recovered by filtration. The solvent was removed from the resulting liquid by distillation under decreased pressure, to give a yellow liquid. The resulting liquid was introduced to a single distillation device, and the pale yellow liquid fraction recovered by distillation at a temperature of 70° C. to 80° C. and pressure of 5 Pa was obtained with a yield of 13.8 g (0.055 ml), percentage yield (relative to InCl) 83%. The resulting pale yellow liquid was a liquid at the storage temperature, room temperature 23° C.

The resulting In($^s$PenCp) was analysed by nuclear magnetic resonance (NMR). The results of $^1$H-NMR using $C_6D_6$ confirmed the structure of In($^s$PenCp). $^1$H-NMR (δ, $C_6D_6$, 400 MHz, 25° C.): 5.92 (t, 2H, Cp-H), 5.81 (t, 2H, Cp-H), 2.57 (m, 1H, Cp-CH—), 1.60-1.25 (m, 4H, —CH$_2$CH$_2$CH$_3$), 1.16 (d, 3H, —CH(CH$_3$)CH$_2$CH$_2$CH$_3$), 0.88 (t, 3H, —CH$_2$CH$_2$CH$_3$)

A JEOL 400 Mz NMR device was employed for NMR analysis.

Figure 2:
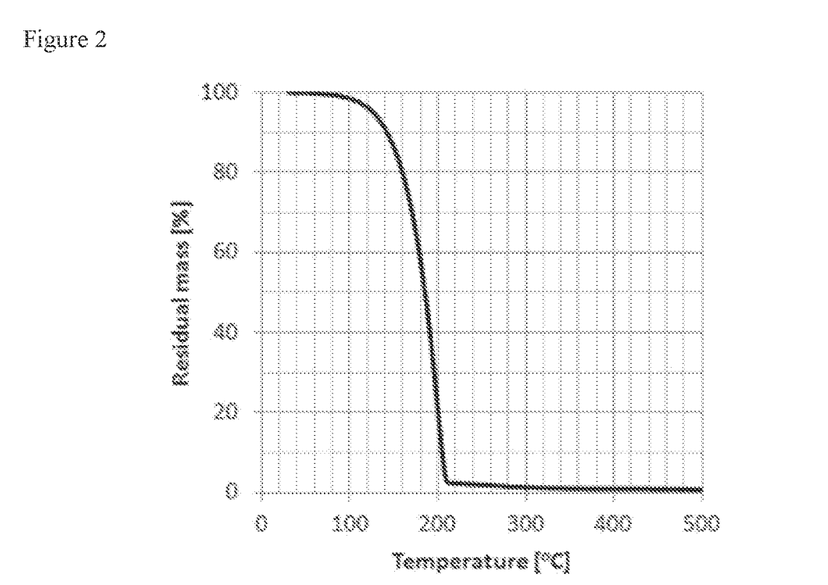
FIG. 2 is a graph showing the result of thermal analysis of In($^s$PenCp) obtained in Example 2.

FIG. 2 is a graph showing the result of thermal analysis of the In($^s$PenCp) obtained above. The conditions of thermal analysis were: TG-DTA measurement with sample weight 24.39 mg, pressure 1 atm., in an atmosphere of nitrogen, heating speed 10.0° C./min. As shown by the solid line in FIG. 2, in thermogravimetric analysis 97.4% was vaporized at up to 210° C., with a residue of 2.6%; therefore, it can be said that thermolysis does not occur in a short time at ≤210° C.

And the result of isothermal gravimetric analysis showed that the vapor pressure of In($^s$PenCp) was 1 Torr at 52.4° C.

A Mettler Toledo TGA/SDTA851 analyzer was employed for thermogravimetric analysis.

Example 3: Synthesis of In($^i$PenCp)

400 mL of dehydrated pentane and 23.2 g of isopentylcyclopentadiene (0.18 mol, 1.1 equiv.) were put into a 1 L capacity container. Then, 104 mL of a 1.6M n-butyllithium solution (0.17 mol, 1 equiv.) was added dropwise at room temperature (20° C.)| The resulting reaction mixture was stirred for 3 hours with a magnetic stirrer, and then the solvent was distilled off at decreased pressure, to give a white solid.

This white solid was suspended in 500 mL of dehydrated diethyl ether, 25.1 g of InCl (0.17 mol, 1 equiv.) was added, followed by stirring at room temperature, and then a yellow filtrate was recovered by filtration.

The solvent was removed from the resulting liquid by distillation under decreased pressure, to give a yellow solid. The resulting solid was introduced to a single distillation device, and the pale yellow liquid which was the fraction from distillation at a temperature of 60° C. to 65° C. and pressure of 0.7 kPa was collected. This liquid solidified when left at room temperature. The yield of the resulting solid was 34.0 g (0.14 mol), and percentage yield (relative to InCl) was 80%, the melting point was 55-56° C.

The resulting In($^i$PenCp) was analysed by nuclear magnetic resonance (NMR). The results of $^1$H-NMR using $C_6D_6$ confirmed the structure of In($^i$PenCp). $^1$H-NMR (δ, $C_6D_6$, 400 MHz, 25° C.: δ 5.93 (t, 2H, Cp-H), 5.83 (t, 2H, Cp-H), 2.46 (m, 2H, Cp-CH—), 1.60-1.35 (m, 3H, —CH$_2$CH(CH$_3$)$_2$), 0.89 (d, 6H, —CH(CH$_3$)$_2$)

A JEOL 400 Mz NMR device was employed for NMR analysis.

Figure 3:
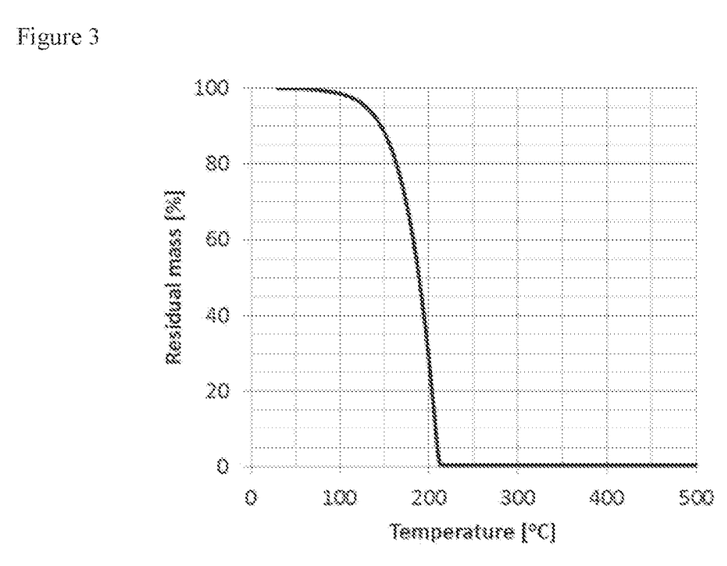
FIG. 3 is a graph showing the result of thermal analysis of In($^i$PenCp) obtained in Example 3.

FIG. 3 is a graph showing the result of thermal analysis of the In($^i$PenCp) obtained above. The conditions of thermal analysis were: TG-DTA measurement with sample weight 24.63 mg, pressure 1 atm., in an atmosphere of nitrogen, heating speed 10.0° C./min. As shown by the solid line in FIG. 3, in thermogravimetric analysis (TGA), 99.4% was vaporized at up to 215° C., with a residue of 0.6%; therefore, it can be said that thermolysis does not occur in a short time at 5215° C.

And the result of isothermal gravimetric analysis showed that the vapor pressure of In($^i$PenCp) was 1 Torr at 65° C.

A Mettler Toledo TGA/SDTA851 analyzer was employed for thermogravimetric analysis.

Example 4: Forming an In$_2$O$_3$ Film by ALD Using In($^s$BuCp)

An indium-containing film was formed on a substrate by ALD by employing In($^s$BuCp) synthesized as an indium compound in Example 1 above and employing O$_3$ as a reaction gas, under the following conditions.

Film-Forming Conditions

A step in which a cylinder filled with In($^s$BuCp) was heated to 39° C., vapor and introduced into a reaction chamber by bubbling using N$_2$ gas at 100 sccm (pulse A), and a step in which O$_3$ produced by an ozone generator was introduced into the reaction chamber by N$_2$ gas at 50 sccm (pulse B) were carried out alternately, separated by purging for 4 seconds with N$_2$ gas at 200 sccm as purge gas. 200 cycles were carried out in the ALD chamber on an Si substrate at a substrate temperature of 250° C., at a pressure of ca. 1 torr. This gave an In$_2$O$_3$ film 28 nm thick. GPC at 250° C. reached 1.4 Å/cycle.

In the results of SIMS analysis of the In$_2$O$_3$ film thus obtained, concentrations of carbon and hydrogen in the film were $2 \times 10^{19}$ atoms/cm$^3$ and $5 \times 10^{20}$ atoms/cm$^3$, respectively (lower limit of detection: carbon $5 \times 10^{18}$ atoms/cm$^3$ and hydrogen $5 \times 10^{19}$ atoms/cm$^3$). A PHI ADEPT1010 was employed for the analysis.

Film thickness and GPC when films were formed under the same film-forming conditions changing only the substrate temperature are presented in Table 1 below. As shown in Table 1, at a film-forming temperature (i.e. substrate temperature when forming a film) of ≤200° C., GPC is <0.7 Å/cycle, and the throughput of the film-forming process is inadequate because the speed of film formation is slow. On the other hand, when the film-forming temperature is of ≥225° C. GPC is ≥0.7 Å/cycle, and film-forming speed can be said to be adequate.

TABLE 1

| 基板温度 (° C.) | 膜厚 (nm) | GPC (Å/cycle) |
|---|---|---|
| 150 | 6 | 0.3 |
| 200 | 6 | 0.3 |
| 225 | 20 | 1.0 |
| 250 | 28 | 1.4 |

TABLE 1-continued

| 基板温度 (° C.) | 膜厚 (nm) | GPC (Å/cycle) |
|---|---|---|
| 275 | 28 | 1.4 |
| 300 | 28 | 1.4 |

基板温度 Substrate temp.
膜厚 Film Thickness

Example 5: Forming an In$_2$O$_3$ Film by ALD Using In($^i$PenCp)

An indium-containing film was formed on a substrate by ALD by employing In(PenCp) synthesized as an indium compound in Example 3 above, and employing O$_3$ as a reaction gas, under the following conditions.

Film-Forming Conditions

A step in which a cylinder filled with In($^i$PenCp) was heated to 39° C., and vapor was introduced into a reaction chamber by bubbling using N$_2$ gas at 100 scorn (pulse A), and a step in which O$_3$ produced by an ozone generator was introduced into the reaction chamber by N$_2$ gas at 50 sccm (pulse B), were carried out alternately, separated by purging for 4 seconds with N$_2$ gas at 200 scorn as purge gas. 200 cycles were carried out on an Si substrate at a substrate temperature of 250° C. in the ALD chamber, at a pressure of ca. 1 torr. This gave an In$_2$O$_3$ film 28 nm thick. GPC at 250° C. reached 1.4 Å/cycle.

Film thickness and GPC when films were formed under the same film-forming conditions changing only the substrate temperature are presented in Table 2 below. As shown in Table 2, at a film-forming temperature (i.e. substrate temperature when forming a film) of ≤200° C., GPC is <0.7 Å/cycle, and the throughput of the film-forming process is inadequate because the speed of film formation is slow. On the other hand, when the film-forming temperature is of ≥225° C., GPC is ≥0.7 Å/cycle, and film-forming speed can be said to be adequate.

TABLE 2

| 基板温度 (° C.) | 膜厚 (nm) | GPC (Å/cycle) |
|---|---|---|
| 200 | 6 | 0.3 |
| 225 | 14 | 0.7 |
| 250 | 28 | 1.4 |
| 275 | 28 | 1.4 |

基板温度 Substrate temp.
膜厚 Film Thickness

As shown above, by using a process for forming an indium-containing film set forth in the present invention, at a temperature of ≥225° C. it was possible to form an indium-containing film at a high GPC.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

The invention claimed is:

1. A method for forming an indium-containing film on at least part of a surface of a substrate, the method comprising:
    (a) placing the substrate into a reaction chamber;
    (b) introducing a vapor that includes a cyclopentadienyl indium compound represented by the following general formula (1) into the reaction chamber;
    (c) purging the reaction chamber with a first purge gas after performing the step (b);
    (d) introducing an oxygen-containing gas into the reaction chamber;
    (e) purging the reaction chamber with a second purge gas after performing the step (d); and
    (f) repeating steps (b)-(e) until a desired thickness of the indium-containing film is obtained, $$In(C_5R^1_xH_{(5-x)}) \tag{1}$$

wherein, in the general formula (1), x is an integer of 1 or more and 5 or less, and each R$^1$ is independently a hydrocarbon group having 5 or more and 8 or less carbon atoms.

2. The method of claim 1, wherein the indium-containing compound is In($^i$PenCp).

3. The method of claim 1, wherein the indium-containing film is an indium oxide film, and the oxygen-containing gas includes at least ozone.

4. The method of claim 3, wherein the oxygen-containing gas further includes water, hydrogen peroxide, oxygen, nitric oxide, nitrous oxide, nitrogen dioxide, a sulfur oxide or a combination thereof.

5. The method of claim 1, wherein the indium-containing film is an insulating material with a relative permittivity (k value) of ≥7.

6. The method of claim 1, wherein the substrate is glass, silicon, silica or a polymer.

7. The method of claim 1, wherein a speed of film formation in one cycle of steps (b)-(e) above is ≥0.7 Å/cycle.

8. The method of claim 1, wherein the melting point of the cyclopentadienyl indium compounds is ≤80° C.

9. The method of claim 1, wherein the indium-containing film is formed by a film-forming process selected from plasma-enhanced atomic layer deposition (PEALD).

10. A process for forming an indium-containing film on at least part of the surface of a substrate, the process comprising:
(a) placing a substrate into a chamber;
(b) introducing a vapor that includes cyclopentadienyl indium compound, represented by the following general formula (1) into the chamber;
(c) purging the chamber with a first purge gas after performing the step (b);
(d) introducing an oxygen-containing gas into the chamber; and
(e) purging the chamber with a second purge gas after performing the step (d); and
(f) repeating steps (b)-(e) at a temperature of $\geq 225°$ C. and $\leq 400°$ C. until a desired thickness of the indium-containing film is obtained, $$In(C_5R^1_xH_{(5-x)}) \qquad (1)$$

wherein, in the general formula (1), x is an integer of 1 or more and 5 or less, and each $R^1$ is independently a hydrocarbon group having 5 or more and 8 or less carbon atoms.

* * * * *